(12) United States Patent  
Poulsen

(10) Patent No.: US 8,776,705 B2  
(45) Date of Patent: Jul. 15, 2014

(54) MAGNUS ROTOR SHIP PROPULSION SYSTEM

(75) Inventor: Peder Ulrik Poulsen, Stratford, CT (US)

(73) Assignee: Poulsen Hybrid, LLC, Shelton, CT (US)

( * ) Notice: Subject to any disclaimer, the term of this patent is extended or adjusted under 35 U.S.C. 154(b) by 76 days.

(21) Appl. No.: 13/598,151

(22) Filed: Aug. 29, 2012

(65) Prior Publication Data

US 2013/0055944 A1 Mar. 7, 2013

Related U.S. Application Data

(60) Provisional application No. 61/575,910, filed on Aug. 31, 2011, provisional application No. 61/632,149, filed on Jan. 19, 2012.

(51) Int. Cl.
*B63B 35/00* (2006.01)

(52) U.S. Cl.
USPC ........................................................ 114/39.3

(58) Field of Classification Search
USPC ........................................................ 114/39.3
See application file for complete search history.

(56) References Cited

U.S. PATENT DOCUMENTS

| | | | |
|---|---|---|---|
| 1,041,825 A | 10/1912 | Low | |
| 1,640,891 A | 8/1927 | Fritzel | |
| 1,665,533 A | 4/1928 | Daily | |
| 1,674,169 A | 6/1928 | Flettner | |
| 1,697,779 A | 1/1929 | Roos | |
| 1,744,924 A | 1/1930 | Sargent | |
| 1,785,300 A | 12/1930 | De La Tour Castelcicala | |
| 1,791,731 A | 2/1931 | Madarasz | |
| 1,796,789 A | 3/1931 | Howard | |
| 1,807,353 A | 5/1931 | Tarshis | |
| 1,820,919 A | 9/1931 | Massey | |
| 1,834,558 A | 12/1931 | Wander, Jr. | |
| 1,927,538 A | 9/1933 | Zaparka | |
| 1,930,380 A | 10/1933 | Binks | |
| 1,977,681 A | 10/1934 | Lee et al. | |
| 2,039,676 A | 5/1936 | Zaparka | |

(Continued)

FOREIGN PATENT DOCUMENTS

| | | |
|---|---|---|
| CN | 101198516 A | 6/2008 |
| CN | 101454197 A | 6/2009 |

(Continued)

OTHER PUBLICATIONS

International Search Report and Written Opinion of the International Searching Authority Application No. PCT/US2012/053065 Completed: Jan. 16, 2013; Mailing Date: Feb. 7, 2013 11 pages.

(Continued)

*Primary Examiner* — Lars A Olson  
*Assistant Examiner* — Jovon Hayes  
(74) *Attorney, Agent, or Firm* — St. Onge Steward Johnston & Reens LLC

(57) ABSTRACT

A watercraft includes a deck and no more than two flettner rotors having a height to diameter ratio of less than five. At least one of the flettner rotors is elevated above the deck such that individuals on the deck can walk underneath the flettner rotor. A portion of a footprint of at least one of the flettner rotors is suspended over an edge of the deck.

23 Claims, 13 Drawing Sheets

(56) References Cited

U.S. PATENT DOCUMENTS

| | | | |
|---|---|---|---|
| 2,078,837 A | 4/1937 | Carter | |
| 2,307,418 A | 1/1943 | McDonald | |
| 2,417,358 A | 3/1947 | Grose | |
| 2,452,355 A | 10/1948 | Candler | |
| 2,532,899 A | 12/1950 | Dubost | |
| 2,596,726 A * | 5/1952 | Rydell | 416/4 |
| 2,985,406 A | 5/1961 | Bump | |
| 3,120,275 A | 2/1964 | Pfleiderer et al. | |
| 3,162,401 A | 12/1964 | Hopwood | |
| 3,262,259 A | 7/1966 | Bennett et al. | |
| 3,262,656 A | 7/1966 | Boehler et al. | |
| 3,439,887 A | 4/1969 | Boehler et al. | |
| 3,692,259 A | 9/1972 | Yuan | |
| 3,734,641 A | 5/1973 | Hirs | |
| 3,757,723 A | 9/1973 | Pangalila | |
| 4,051,622 A | 10/1977 | Sharp | |
| 4,161,154 A | 7/1979 | Kollenberger | |
| 4,225,286 A | 9/1980 | Fork | |
| 4,316,721 A | 2/1982 | Weiss et al. | |
| 4,366,386 A | 12/1982 | Hanson | |
| 4,401,284 A * | 8/1983 | Austin | 244/21 |
| 4,446,379 A * | 5/1984 | Borg et al. | 290/55 |
| 4,602,584 A * | 7/1986 | North et al. | 114/39.3 |
| 6,932,553 B1 | 8/2005 | Roodenburg et al. | |
| 8,134,251 B2 * | 3/2012 | Barber | 290/55 |
| 8,230,798 B2 * | 7/2012 | Rohden | 114/39.3 |
| 8,539,894 B2 * | 9/2013 | Levander | 114/39.3 |
| 8,601,964 B2 * | 12/2013 | Rohden | 114/39.3 |
| 2009/0217851 A1 * | 9/2009 | Kind | 114/39.3 |
| 2009/0241820 A1 * | 10/2009 | Rohden | 114/39.3 |
| 2009/0311924 A1 * | 12/2009 | Wobben | 440/6 |
| 2011/0209650 A1 * | 9/2011 | Fan | 114/39.3 |
| 2012/0000408 A1 * | 1/2012 | Levander et al. | 114/39.3 |
| 2013/0055944 A1 * | 3/2013 | Poulsen | 114/39.3 |

FOREIGN PATENT DOCUMENTS

| | | |
|---|---|---|
| DE | 102005062615 A1 | 6/2007 |
| FR | 659443 A | 6/1929 |
| GB | 249730 A | 4/1926 |
| GB | 244791 A | 7/1926 |
| GB | 284940 A | 2/1928 |
| GB | 2006885 A | 5/1979 |
| TW | M397355 U | 2/2011 |
| WO | 2007076825 A1 | 7/2007 |
| WO | 2011098601 A1 | 8/2011 |
| WO | 2011098605 A1 | 8/2011 |

OTHER PUBLICATIONS

Office Action of the Intellectual Property (translation), Application No. (Taiwan) 101131614, Issued: Feb. 25, 2014, 9 pages.

* cited by examiner

MAGNUS ROTOR SHIP PROPULSION SYSTEM

CROSS-REFERENCE TO RELATED APPLICATIONS

The present application claims the benefit under 35 U.S.C. §119(e) of U.S. Provisional Application No. 61/575,910 filed on Aug. 31, 2011 and U.S. Provisional Application No. 61/632,149 filed on Jan. 19, 2012. The contents of both of those applications are incorporated herein by reference.

FIELD OF THE INVENTION

The apparatus described herein generally relates to the field of rotor ships, and more directly, rotor ships with flettner rotors with extremely low height to diameter ratios.

BACKGROUND OF THE INVENTION

Rotor ships exploit the Magnus effect to generate wind propulsion. In essence, the Magnus effect dictates that a rotor in a wind stream will generate low and high pressure regions on either side of the rotor tangential to the direction of the wind stream. Thus, a powered rotor can propel a ship in a wind stream by harnessing some of the energy of the wind stream and redirecting it to propelling the ship.

The rotor ship was invented by Anton Flettner in the early 1920s. Flettner constructed the first rotor ship, the Buckau, in 1924. The Buckau proved the viability of rotor ship technology on its maiden voyage in February 1925, crossing the North Sea from Danzig to Scotland. Despite being dogged by extremely poor weather, the voyage was a success and proved that Flettner rotors were sufficiently effective and durable for ship propulsion, even in the harshest conditions.

Although Flettner had demonstrated that Magnus propulsion was a viable shipping technology, the rotor ship did not achieve mainstream success in the $20^{th}$ century shipping industry. Conventional water propeller systems remained the mainstream choice, in part because those systems are simple and their performance is not dependent on weather conditions. Furthermore, fossil fuels generally remained inexpensive during this era, at least compared with the costs associated with more exotic ship designs that improved efficiency.

Those market realities began to change in the early $21^{st}$ century. Fuel prices increased as did political pressure to reduce fuel consumption and emissions. Furthermore, the late 2000's global recession placed incredible pressure on the shipping industry. The total volume of cargo traffic decreased significantly, as did demand for new ships. Shipping companies that have survived in this market are very interested in cutting costs wherever possible, including fuel costs.

These paradigm shifts have renewed interest in rotor ship technology because of potential fuel savings and emissions reductions. Of particular interest are retrofittable rotor systems, because of the aforementioned reduction in new ship production. However, the old rotor designs of the early $20^{th}$ century and similar contemporary designs leave much to be desired.

The primary problem is the space taken up on the deck by having several rotors. This is especially problematic on ships that were not originally designed to use flettner rotors (retrofitted ships). Attempts have been made to get around this problem, such as retractable telescoping rotors or foldable rotors. However, these systems are complex, potentially fragile in extreme weather conditions, and do little to save deck space.

There remains a need in the art for a truly modern rotor ship system that can be incorporated on modern non-rotor ships with minimal interference with their normal operation. Such a design could result in huge fuel consumption and emissions reductions because it could be incorporated on a large portion of the global shipping fleet.

SUMMARY OF THE INVENTION

A watercraft includes a deck and no more than two flettner rotors having a height to diameter ratio of less than five. At least one of the flettner rotors is elevated above the deck such that individuals on the deck can walk underneath the flettner rotor. A portion of a footprint of at least one of the flettner rotors is suspended over an edge of the deck.

A method of manufacturing a flettner rotor includes the steps of assembling a cage and rotating the cage 360 degrees relative to a supply of sheet. The method further includes wrapping a sheet around the cage as they are rotated relative to each other until the cage is substantially covered by the sheet material. The method further includes mounting the sheet to the cage as it is wrapped around the cage.

A method of manufacturing a flettner rotor includes providing a spindle and providing a plurality of planar frames. The method further includes mounting the frames in a circular configuration around the spindle and wrapping a sheet around the frames such that the ends of the frames are substantially covered by the sheet. The method further includes mounting an end plate with a larger diameter than the rotor diameter on an upper portion of the frames and a skirt, also with a larger diameter than the rotor diameter on the lower end of the frames.

A flettner rotor includes a plurality of frames comprising horizontal spokes, vertical columns, and diagonal members. The flettner rotor further includes a spindle comprising at least one flange coupled to the horizontal spokes. The flettner rotor further includes a sheet disposed on the frames and an end plate disposed on the top of the frames.

A method of retrofitting a flettner rotor onto a ship includes the steps of providing a previously assembled ship and manufacturing one or two flettner rotors separately from the ship, the flettner rotors having a height to diameter ratio of less than five. The method further includes installing a mounting platform off of a stern or bow end of the deck. The method further includes installing the flettner rotor on the mounting platform in an elevated position such that individuals on the deck can walk underneath the flettner rotor. Less than 50% of a footprint of the flettner rotor is over the deck.

DETAILED DESCRIPTION OF THE INVENTION

Figure 1:
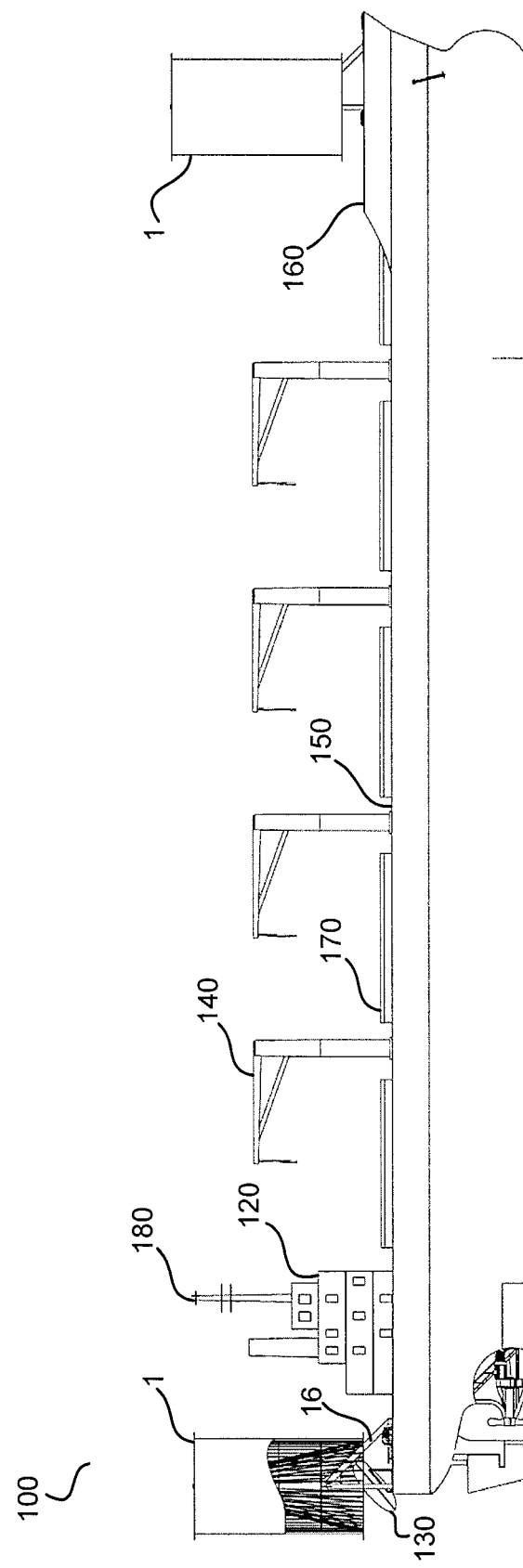
FIG. 1 is a starboard side view of a watercraft according to one embodiment.

FIG. 1 is a starboard side view of a watercraft 100 according to one embodiment. Watercraft 100 is a bulk carrier in this embodiment which has been retrofitted with two flettner rotors 1. Flettner rotors 1 are mounted to ship using support legs 16. Flettner rotors 1 are mounted such that they do not interfere with the ship cranes 140 or cargo hold hatches 170 which are needed for loading and unloading cargo from ship 100. Flettner rotors 1 in this embodiment have a height to diameter ratio of less than five. In some embodiments, flettner rotors 1 have a height to diameter ratio of less than two. In this embodiment, one rotor 1 is mounted at a stern end of deck 150 and the other rotor 1 is mounted at the bow end of watercraft 100, on the forecastle 160.

Flettner rotors 1 are mounted on ship 100 such that they are elevated from deck 150 and forecastle 160. Flettner rotors 1 are elevated above deck 150 and forecastle 160 sufficiently high so that crew members can walk underneath flettner rotors 1 and perform work on deck 150 and forecastle 160. Thus, the normal operation of the crew will not be interrupted by the installation of flettner rotor 1. In some embodiments, the bottoms of flettner rotors 1 are at least two or three meters above deck 150 or forecastle 160. Rotors 1 should be at least two meters above deck 150 and forecastle 160 so as to be high enough for crew members to walk under. Preferably, the rotors are at least 3 meters above deck 150 and forecastle 160 to provide plenty of headroom for the crew walking on deck 150 or forecastle 160 and prevent contact between the crew and rotors 1, which could result in injury. With the rotors 1 sufficiently elevated, the crew can perform its normal occupational duties underneath rotors 1, making rotors 1 less of an obstruction to the normal operation of ship 100. The anchor winches, chain guides and wells on and below forecastle 160; along with the mooring winches, bollards, and towing equipment on the aft deck 150 are heavy, costly, and difficult to relocate. The elevation of rotors 1 and the lack of deck space taken up by support legs 16 eliminate the need to relocate heavy equipment or alter normal crew operations after retrofitting one or more rotors 1 onto an existing ship.

The stern flettner rotor 1 is mounted so that part of its footprint is not over deck 150. In other words, stern flettner rotor 1 overhangs deck 150 and rotor 1 is suspended over an edge 500 of deck 150. This saves space on deck 150, increases the clearance between superstructure 120 and rotor 1, and allows for easier retrofitting of flettner rotor 1. Superstructure 120 also creates a wind shading effect which would decrease the performance of a rotor 1 mounted too closely to it. Thus, by having a portion of rotor 1 overhang edge 500, the performance of rotor 1 is improved. Lifeboat 130 is mounted inside stern flettner rotor 1. Since the underside of flettner rotors 1 is conical and empty in the center, there is room to stow lifeboat 130 inside the bottom portion of flettner rotor 1. Because stern flettner rotor 1 overhangs deck 150, lifeboat 130 can be stowed inside stern flettner rotor 1 and easily deployed by dropping lifeboat 130 off of edge 500 of deck 150 in an emergency. In this embodiment, approximately 50% of the footprint of stern flettner rotor 1 is above deck 150. The overhang of flettner rotor 1 can also be clearly seen in FIGS. 3 and 5. In the embodiments shown, rotor 1 is mounted at a stern end of ship 100 and overhangs deck 150 at stern end 300 of ship 100.

Figure 3:
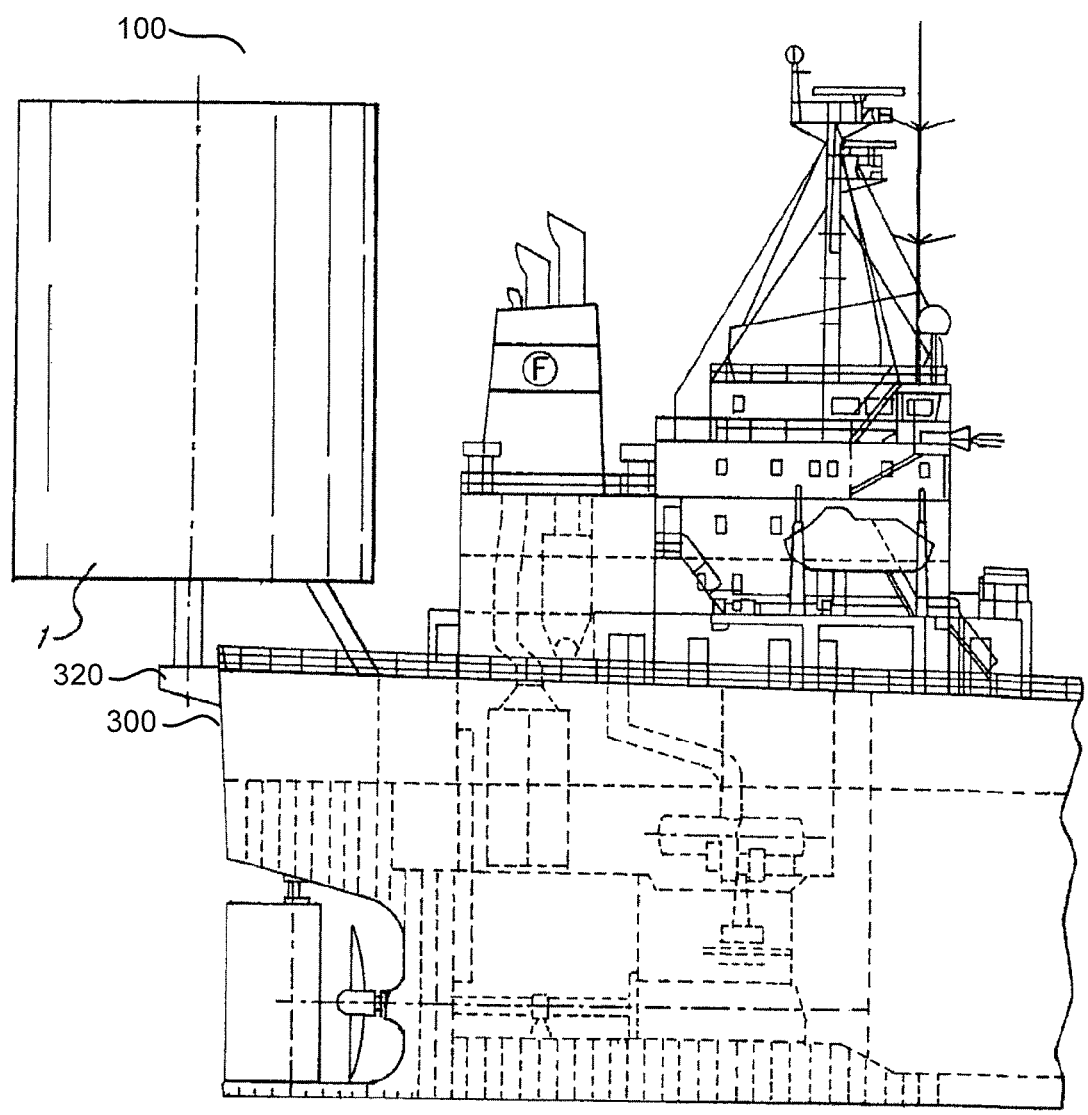
FIG. 3 is a starboard side view of the stern of a watercraft according to the embodiment shown in FIG. 1.

In some embodiments such as the embodiment shown in FIG. 3, less than 50% of the footprint of flettner rotor 1 is above deck 150. In that embodiment, an axle or central axis of rotor 1 is suspended over edge 500 of deck 150 by a cantilever 320. In that embodiment, drive motor 14 must be suspended over edge 500 of deck 150, or power must be mechanically routed to rotor 1 from inside ship 100 via a drive train. The deck edge 500 is one of the strongest points on ship 100 and is ideal for supporting the substantial forces generated by rotor 1 and transferring the propulsion thrust to ship 100. Furthermore, installing rotor 1 off of deck edge 500 is ideal for retrofitting ships where clearing obstacles on deck 150 may be impossible if the entire footprint of rotor 1 is over deck 150 (as shown in FIG. 3). Thus, it is advantageous to mount the drive axle cantilevered off of the edge of the ship. Since this drive axle is in the center of rotor 1, this means that less than 50% of the rotors footprint will be over deck 150.

Figure 5:
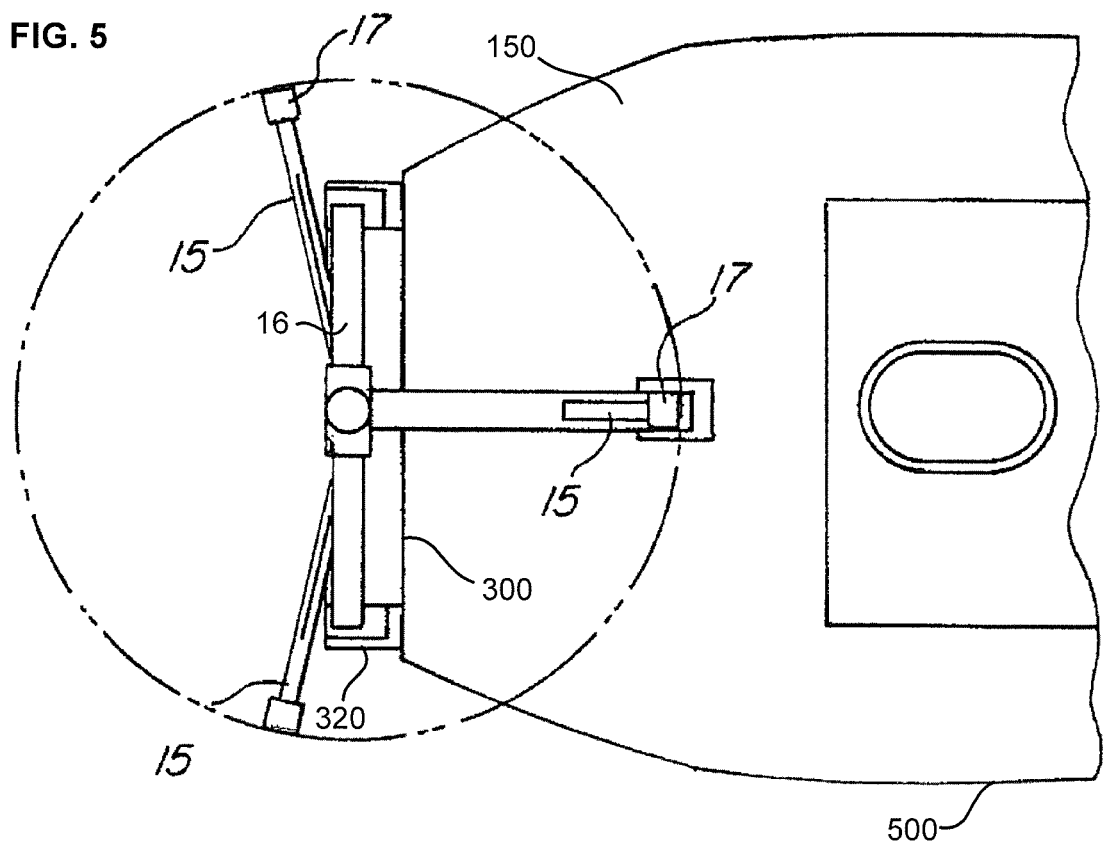
FIG. 5 is a transparent top view of a flettner rotor mounting on a watercraft according to the embodiment shown in FIG. 1.

As shown in FIG. 5, support legs 16 are arranged in a sprawling manner that allows mounting directly onto or cantilevered off of edge 500 of deck 150 to provide a stable base for rotor 1. Support legs 16 may be at an angle of 45 degrees relative to deck 150. Having two support legs aligned with deck edge 500 and one on deck 150 distributes the weight and force generated by rotor 1 over a large area.

Superstructure 120 including a funnel and a mast 180 form the highest point above waterline on ship 100 before flettner rotors 1 are installed. In this embodiment, mast 180 is the highest point above waterline on ship 100 before rotors 1 are installed. Flettner rotors 1 are not significantly higher than the highest point of superstructure 120, mast 180, or ship cranes 140. Therefore, the total height of ship 100 is not substantially increased by the installation of flettner rotors 1, allowing ship 100 to clear the same overhead obstacles as it was capable of clearing prior to retrofitting.

The thrust generated by a flettner rotor increases with its diameter. By having rotors with a very low height to diameter ratio (i.e. thicker rotors), significant thrust can be generated without impeding deck space or significantly increasing the height of ship 100. This is especially true given that fewer rotors 1 can be used while still achieving the desired level of thrust. The larger diameter rotors 1 allow for a maximum thrust while not adding to the total height of ship 100 or using an unnecessary number of rotors 1, which would take up deck space. Furthermore, having fewer and wider rotors 1 makes elevating rotors 1 above deck 150 a viable option for saving deck space. Elevating a large number of conventional thin rotors would do little to save deck space and significantly increase complexity.

Figure 2:
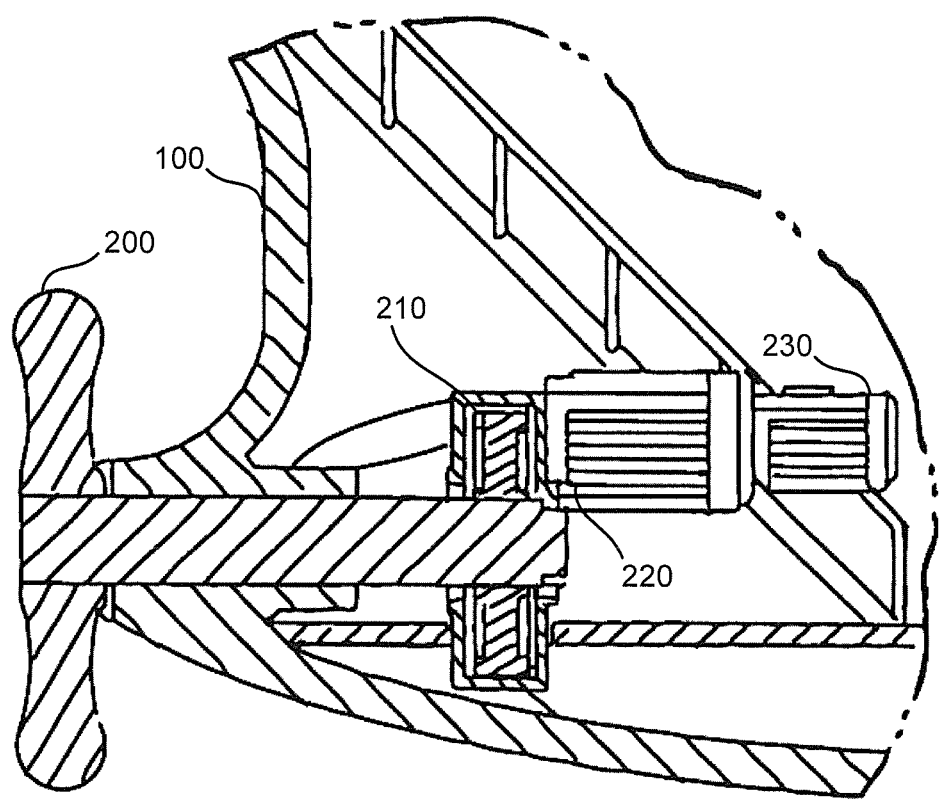
FIG. 2 is a close-up of the drive train of the watercraft of FIG. 1.

Most conventional ships have direct-drive diesel drive trains. However, FIG. 2 is a close-up of an embodiment of the drive train of ship 100 using a diesel-electric drive train. The drive train in this case is a diesel-electric system wherein a diesel engine generates electrical power which powers electric motor 220. Electric motor 220 drives main gear drive 210, which in turn rotates propeller 200. This provides thrust to ship 100. Electric generator 230 is also operatively connected to the drive train. Because ship 100 is a rotor ship, in certain situations (such as ideal wind conditions) it is advantageous to propel ship 100 using only rotors 1. In that situation it is also advantageous to harness energy from the wind indirectly via the rotor-propelled movement of ship 100. Thus, electric generator 230 can draw electrical power from the rotation of propeller 200 generated from the forward motion of ship 100. For these reasons, it is advantageous to have a diesel-electric drive train in a flettner rotor equipped ship.

Figure 4:
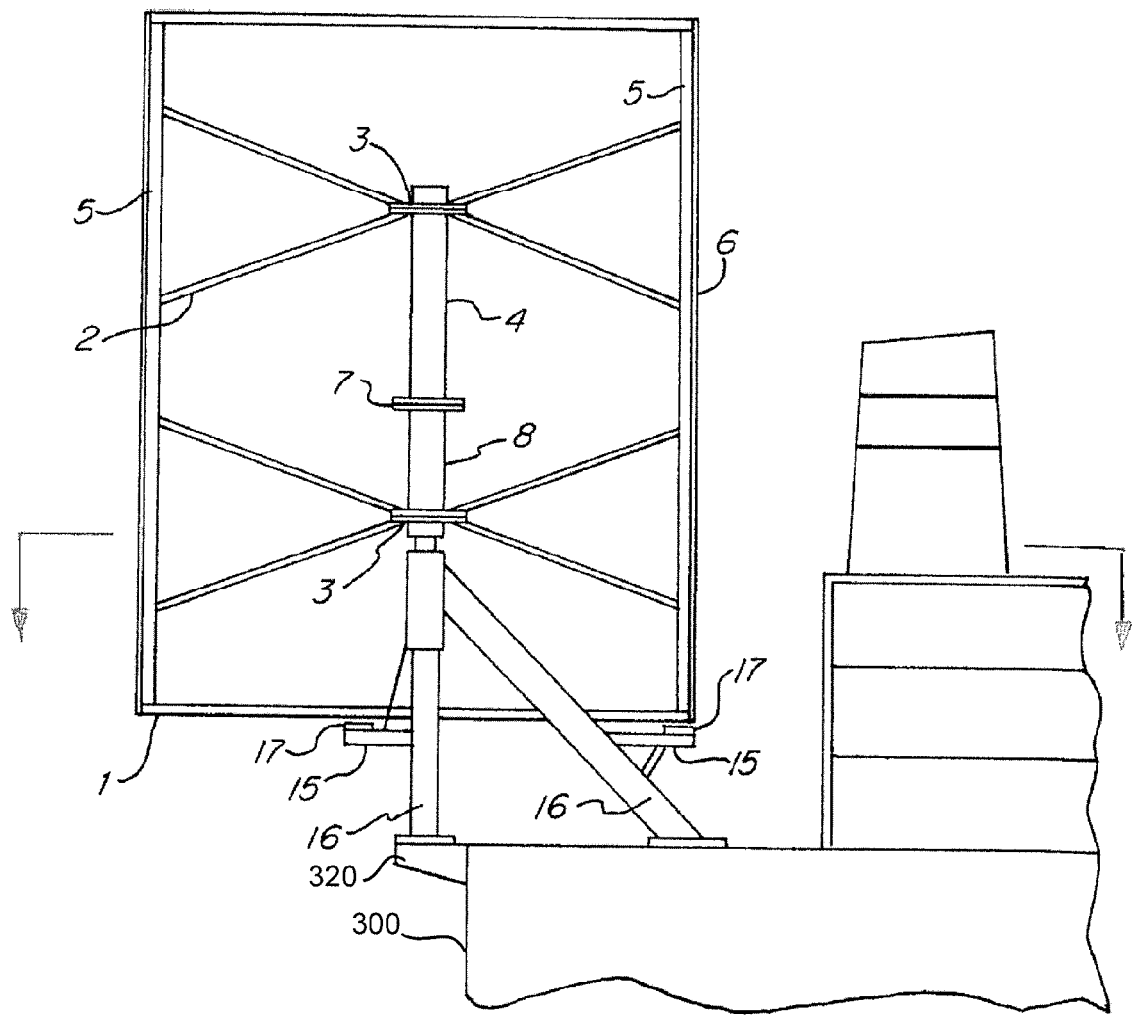
FIG. 4 is a sectional view of a flettner rotor mounted to a watercraft according to the embodiment shown in FIG. 1.
Figure 6:
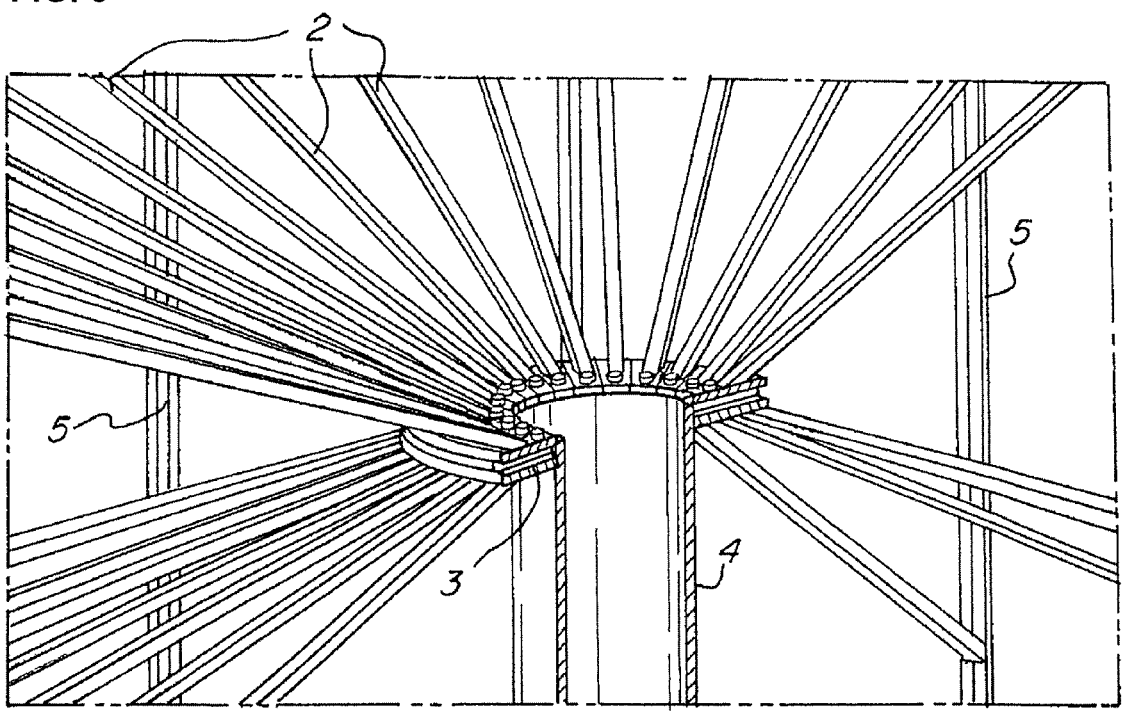
FIG. 6 is an isometric sectional view of the internals of a flettner rotor according to the embodiment shown in FIG. 1.
Figure 13:
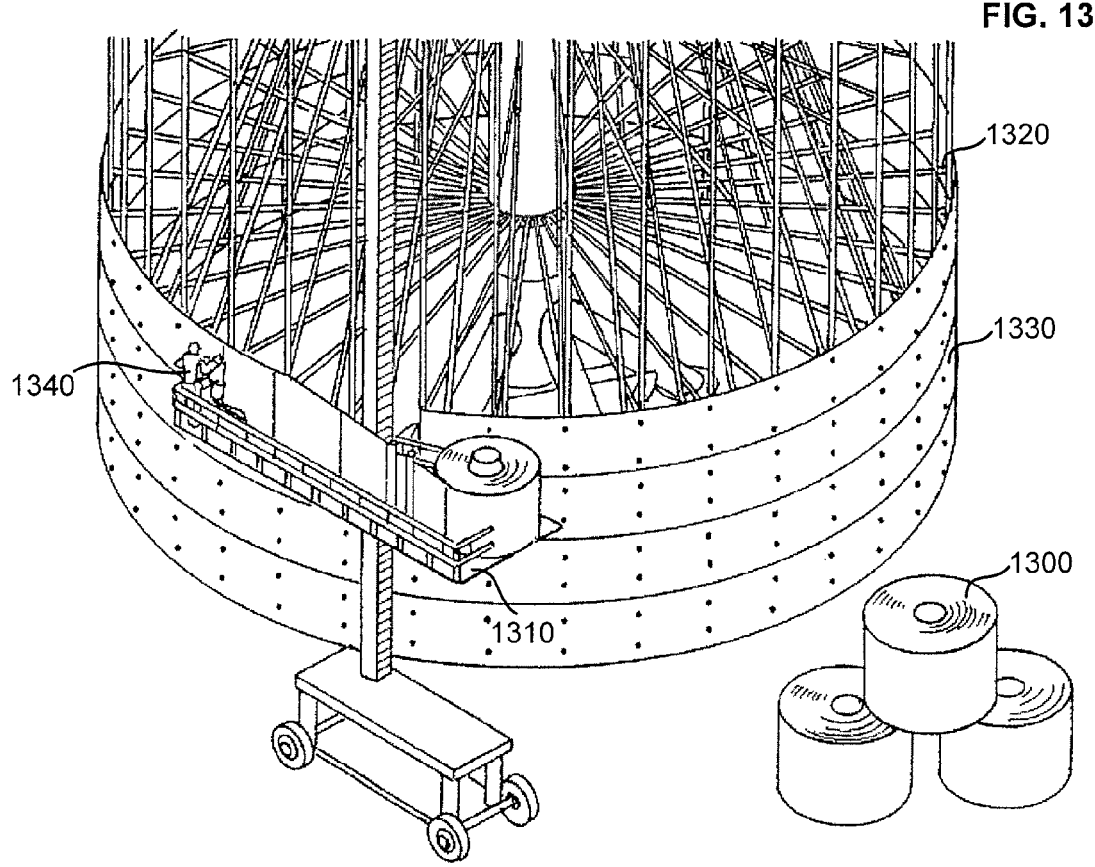
FIG. 13 is an isometric view of a flettner rotor according to the embodiment shown in FIG. 1 being assembled.

FIG. 4 is a sectional view of a flettner rotor according to one embodiment. Rotor 1 must be able to resist the considerable forces developed in wind speeds typically up to 20 m/s during operation and up to 60 m/s (hurricane conditions) while stationary. In the embodiment of FIGS. 4 and 6, rotor 1 features an internal structure consisting of a large number of radial members or spokes 2, connected to hub rings 3, which are welded onto a strong central tube 4. The distal ends of spokes 2 are bolted or welded to vertical members or beams 5, each beam 5 is as long as the height of rotor 1. In the present embodiment, four spokes 2 and one beam 5 comprise a frame and the internal rotor structure comprises thirty-six frames spaced 10 degrees apart. The skin 6 forming the external surface of rotor 1 may consist of steel or aluminum sheet or fiberglass shell which is attached to beams 5 by means of screws or rivets thus covering the entire surface of rotor 1. The individual sheets or bands may be welded together or otherwise joined in order to present a continuous, smooth, largely cylindrical surface, as shown in FIG. 13.

Figure 7:
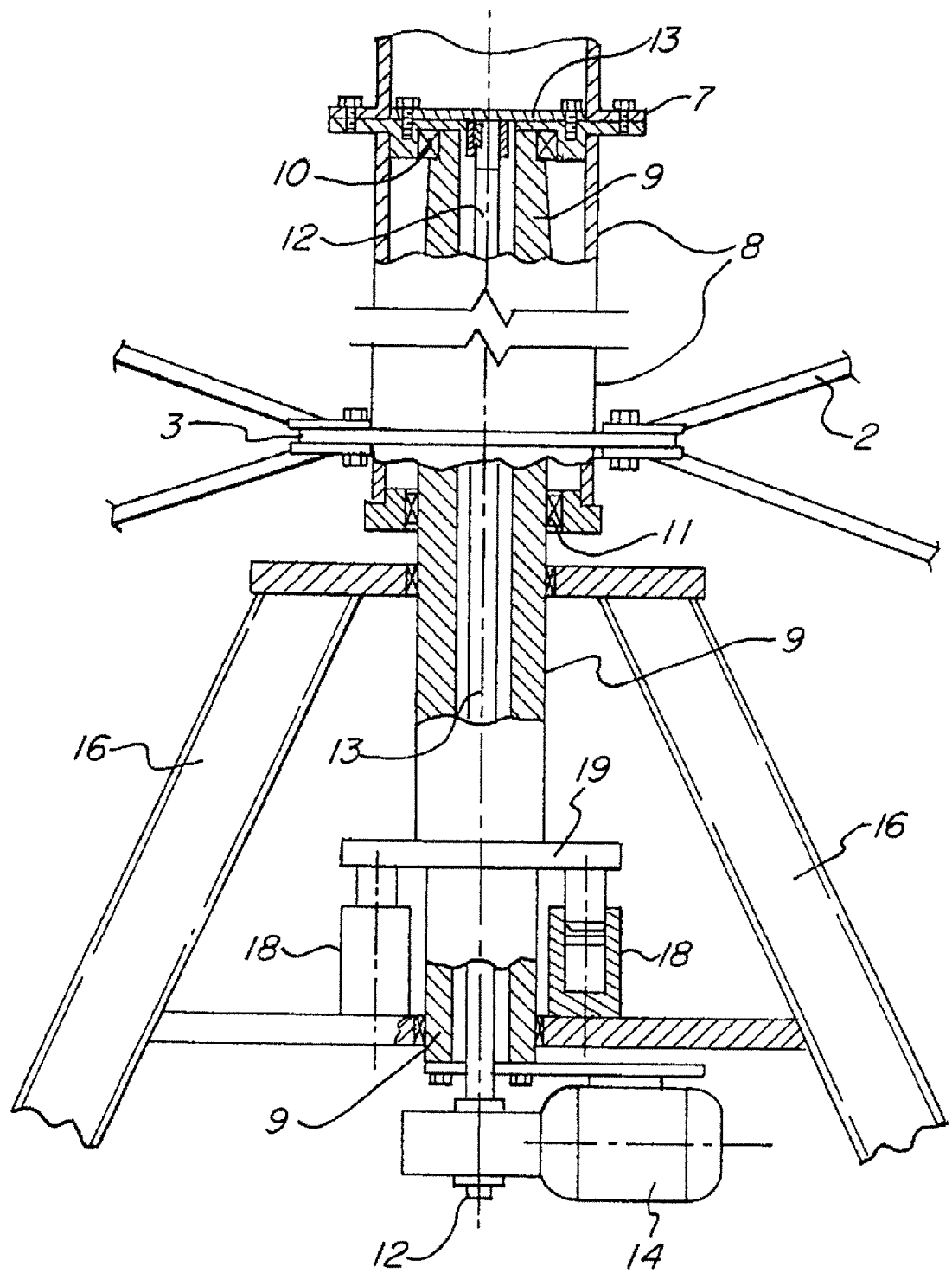
FIG. 7 is a sectional view of the drive system of a flettner rotor according to the embodiment shown in FIG. 1.

As shown in FIGS. 4 and 7, central tube 4 consists of two sections, which are coupled by flange 7 with the lower section 8 surrounding a tubular axle 9 and being supported by a bearing 10 (i.e. a tapered roller bearing) able to support the weight of rotor 1 while at the same time absorbing the large perpendicular propulsive force and wind loads experienced while rotor 1 is rotating or stationary during extreme weather conditions. A second bearing 11 (i.e. a radial roller bearing) surrounds axle 9 and guides the lower section of central tube 4.

A shaft 12 is extended upwards concentrically through a bore in axle 9, and keyed to cover 13, which is bolted internally to flange 7. Shaft 12 protrudes downwards past the lower end of axle 9 where it is connected with the output axle of an electric gear motor 14. The motor 14 may be an AC motor powered from a variable frequency inverter drive or a variable speed hydraulic motor capable of spinning the rotor at a circumferential velocity on the order of two to four times the wind speed.

The propulsive force developed by the system may amount to as much as 50 metric tons in a vessel moving at 14 knots in a 20 m/s crosswind. This amount of force on rotor 1, and the resulting bending moment on axle 9 while the system is operating exceeds the force developed while the rotor is stationary in a hurricane force wind, meaning that as long as the rotor is not turning it does not need to be collapsed or otherwise stowed due to wind conditions. However, in one embodiment ship 100 includes means for momentarily securing rotor 1 against damage due to excessive forces caused by the roll and pitch of ship 100 in extreme weather conditions.

To that purpose, the embodiment in FIGS. 4 and 5 comprise beams 15 extending radially from support legs 16 and provided with support pad 17 located a short distance below the lower rim of rotor 1. Central axle 9 is arranged to move axially in its guides and supported by hydraulic cylinders 18 via a yoke 19 which carry the weight of the rotor, keeping it clear of the support pads 17 during operation. Securing rotor 1 can now be accomplished hydraulically from the bridge by bringing rotor 1 to a standstill and lowering it to rest safely on support pads 17 for as long as it is required. Conversely, the same result can be achieved without lowering the rotor by installing hydraulic cylinders with pressure pads to engage the lower edge of the rotor onto the distal ends of beams 15.

Figure 8:
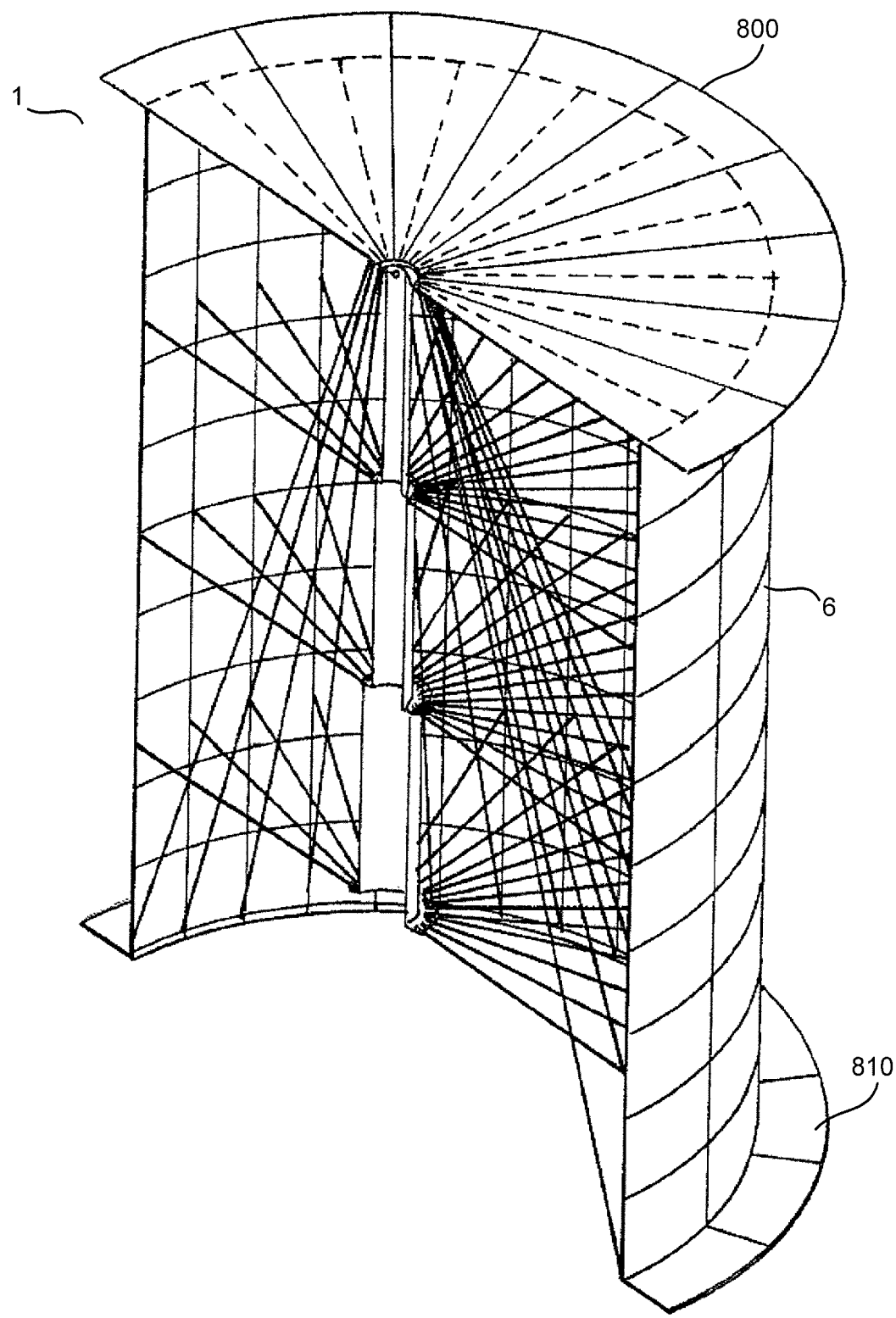
FIG. 8 is an isometric sectional view showing the internals of a flettner rotor according to the embodiment shown in FIG. 1.
Figure 9:
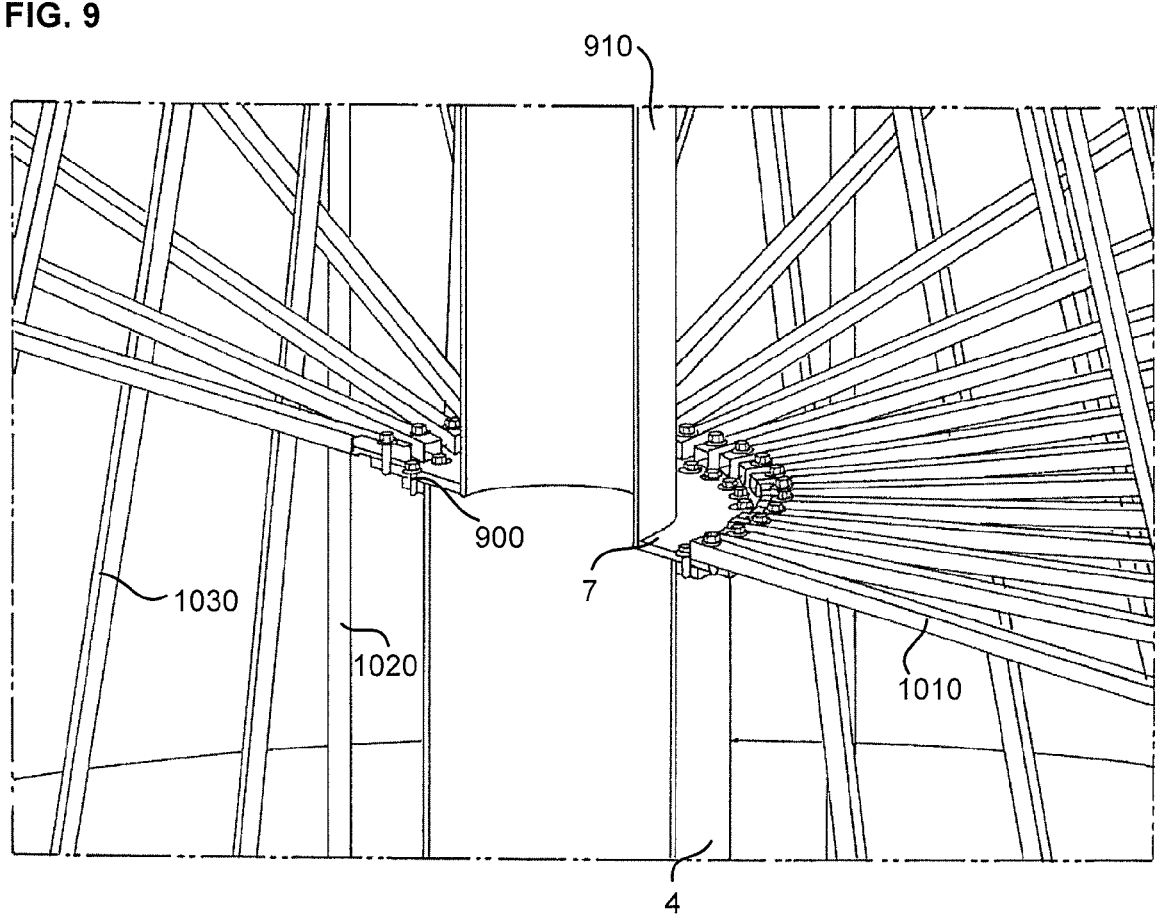
FIG. 9 is an isometric sectional view of the internals of a flettner rotor according to the embodiment shown in FIG. 1.
Figure 10:
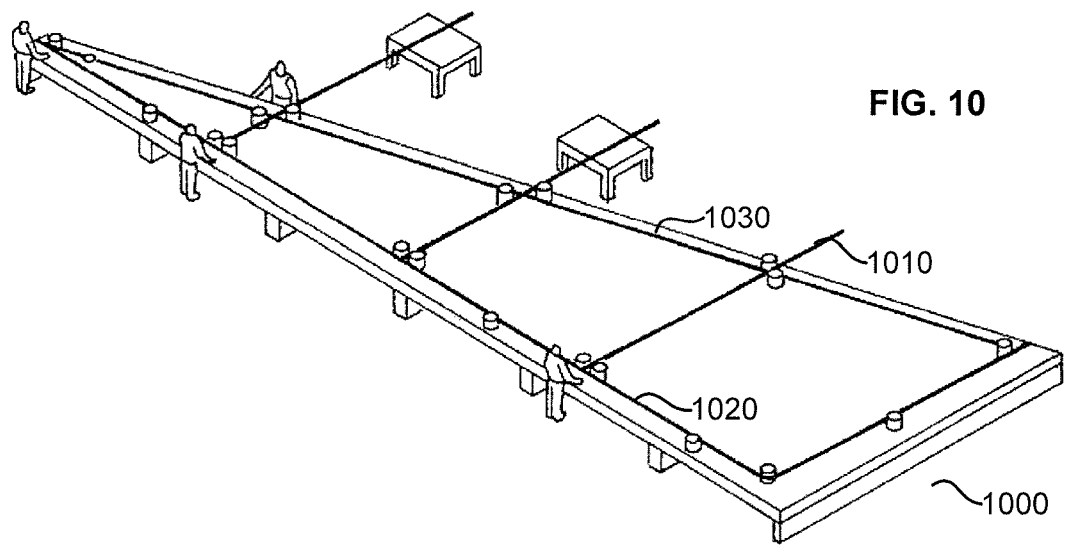
FIG. 10 is an isometric view of a frame for a flettner rotor according to the embodiment shown in FIG. 1 being assembled.

FIGS. 8 and 9 show the internal structure of one embodiment of rotor 1. This embodiment of rotor 1 comprises end plate 800 at the top. This embodiment may also include lower flange 810 at the bottom. Lower flange 810 and end plate 800 have a greater diameter than the body of rotor 1. End plate 800 and lower flange 810 reduce the so-called "boundary effect" of the edges of the cylinders; thereby improving the efficiency of and thrust generated by rotor 1. The spine or central structure is composed of tubular elements, 8, 4, and 910 stacked one on top of one another and interconnected by means of flanges 7 and multiple bolts 900. The supporting skeleton is composed of frames 1000, each frame 1000 comprising horizontal spokes 1010, vertical columns 1020, and diagonal members 1030 which are jig welded together into identical flat structures (frames 1000). Frames 1000 are shown in detail in FIG. 10 and may be pre-fabricated and stored for later use.

When installed in vessel 100, rotor 1 is supported on a vertical drive shaft 9 whose top part is located inside the lower central tube 8. The manufacturing plant features a similar, assembly drive shaft 1100, which is placed standing upright on the factory floor and serves to support and slowly rotate rotor 1 during assembly.

The large dimensions of the rotors 1 described herein present unique construction challenges. Rotors 1 must be lightweight and strong as discussed above, and have such a large diameter that external skin 6 is more difficult to construct as a single tube or unit structure. Thus, the following methods for constructing rotors 1 in accordance with the embodiments shown herein are discussed below.

Figure 11:
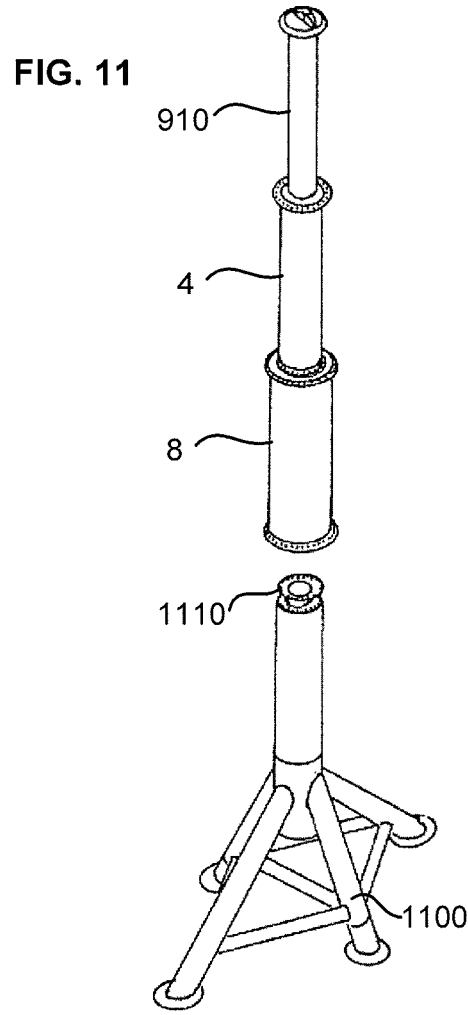
FIG. 11 is an isometric view of an axle for a flettner rotor according to the embodiment shown in FIG. 1 with an assembly drive shaft.

The process includes the following steps:

(A) An assembled central structure or spine consisting of sections 8, 4, and 910 are lowered onto assembly drive shaft 1100 and temporarily bolted in place onto assembly flange 1110, as shown in FIG. 11.

Figure 12:
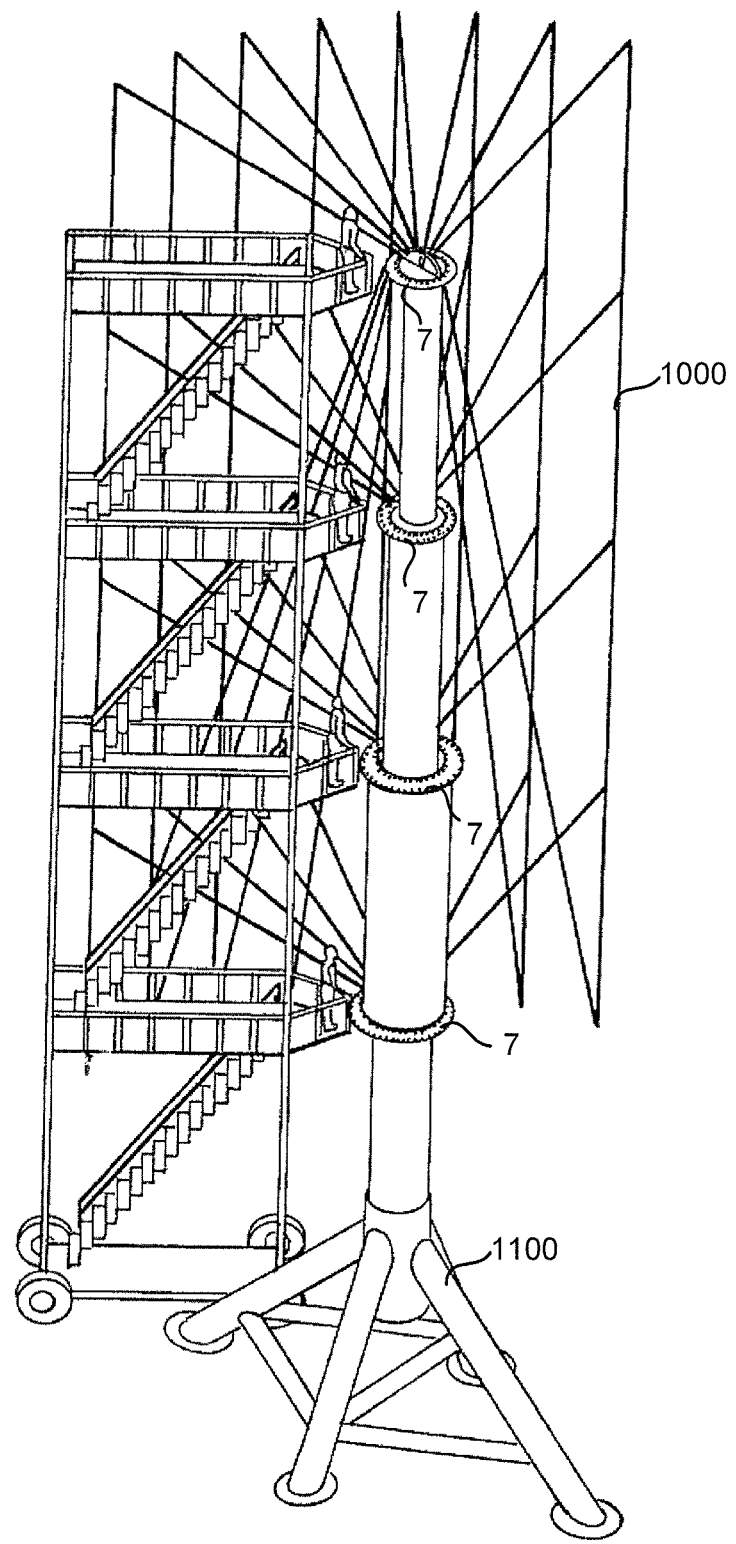
FIG. 12 is an isometric view of the frames shown in FIG. 10 being assembled onto the axle shown in FIG. 11 to construct a flettner rotor according to the embodiment shown in FIG. 1.

(B) The frames 1000 are lowered into place one by one and their horizontal spokes 1010 bolted onto the four tiers of flanges 7 (as shown in FIG. 9). The supporting cage is assembled, with each frame 1000 extending radially and the vertical columns 1020 spaced equidistantly around the circumference, as shown in FIG. 12.

(C) Coils of sheet material 1300, typically 1 to 2 meters wide are placed one after another on a vertically indexable platform 1310 and unwound as the material is transferred onto the slowly rotating rotor cage 1320. During the process the band 1330 is welded, riveted or bolted onto the vertical columns 1020. After completion of a full revolution, band 1330 is cut and the two ends joined by welding or secured in place by other means. Platform 1310 is then raised an amount equal to the width of coil 1300, and the process is repeated step by step until the entire rotor cage 1320 is covered. This portion of the process is shown in FIG. 13.

(D) Rotor 1 is brought into slow rotation in front of a stationary welding head 1340, and the horizontal joint separating the first and second tier of band material welded closed.

Welding head 1340 is indexed upwards one step using platform 1310, and the process repeated until all the horizontal joints have been welded. This portion of the process is shown in FIG. 13.

Figure 14:
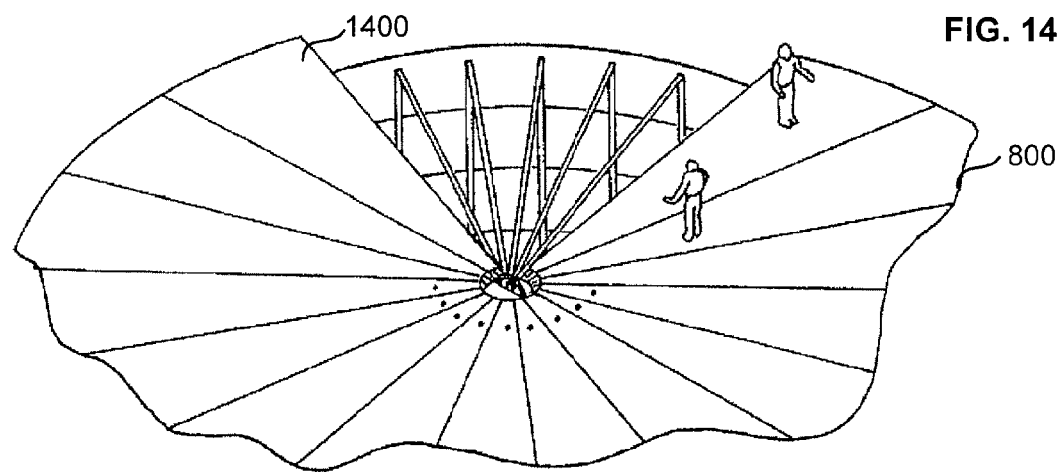
FIG. 14 is an isometric view of a flettner rotor according to the embodiment shown in FIG. 1 being assembled.

(E) The top of rotor 1 is closed by means of triangularly shaped sheet metal sections 1400 which are welded or otherwise affixed onto the top tier of spokes 1010 forming end plate 800, as shown in FIG. 14.

(F) The assembled rotor is unbolted from assembly drive shaft 1100, lifted clear and stored to await installation on vessel 100.

Figure 15:
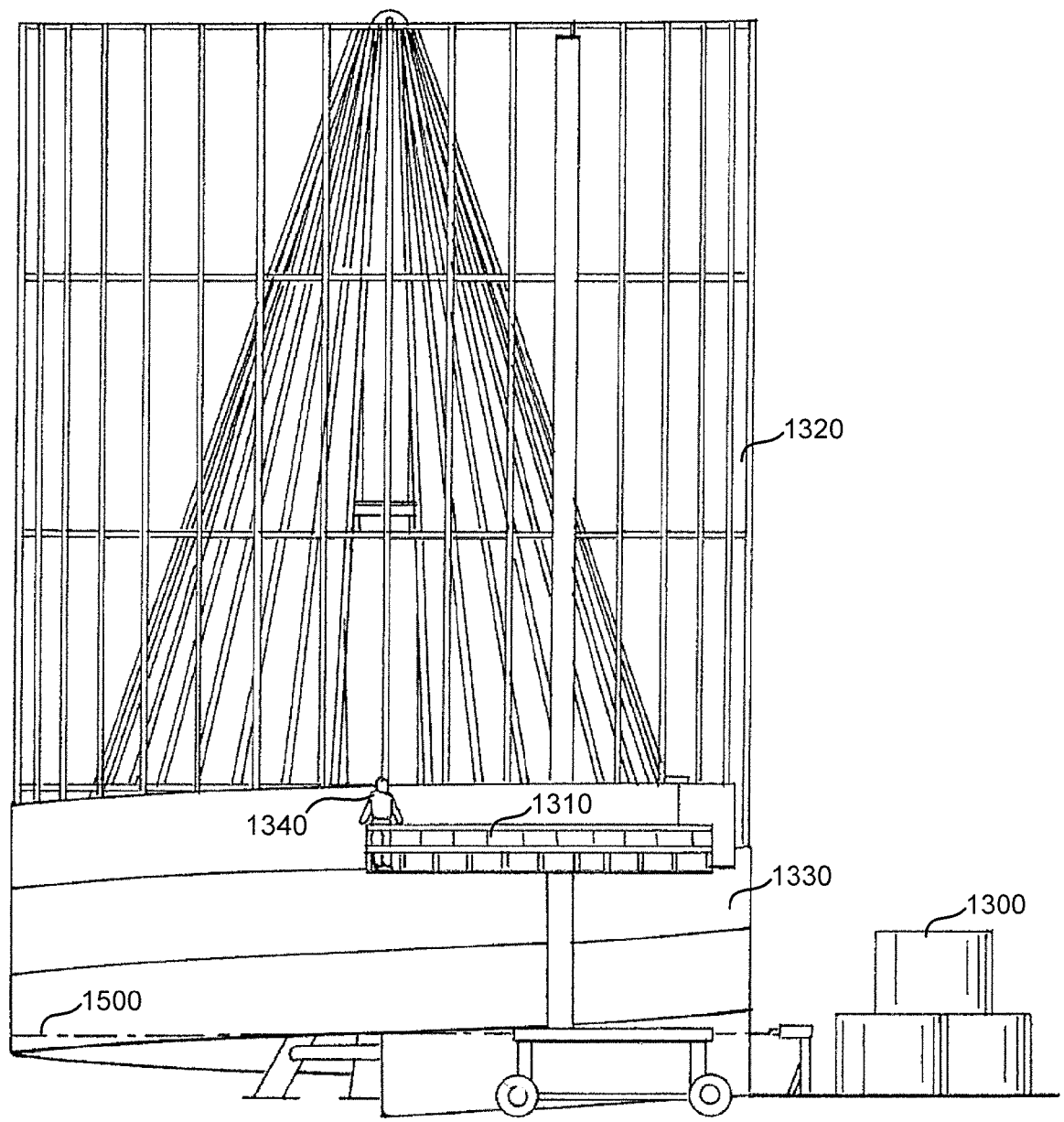
FIG. 15 is a side view of a flettner rotor according to the embodiment shown in FIG. 1 being assembled.

A more mechanized variation of installing the sheet material (steps C and D) is shown in FIG. 15 and discussed below.

(C') Coils of sheet material 1300 are placed one after another onto platform 1310 which is raised continuously at a rate equal to the width of band 1330 each revolution of rotor skeleton 1320. The process of winding band 1330 onto the cage has to be interrupted only when a coil 1300 of material is completely used up and needs to be replaced. The continuous process saves labor and enables the horizontal edges to be joined by means of a stationary welding head 1340. The helical winding process may equally well start from the top while lowering platform 1310 at a steady rate as starting from the bottom while raising the platform 1310 as described. Upon completion of rotor surface 6, the excess material applied during the first and last turn is cut off along the horizontal dotted line 1500.

In embodiments where external skin 6 is made of fiberglass, an entire fiberglass tube or shell is constructed separately from rotor skeleton 1320. The shell is then placed over skeleton 1320 and mounted to skeleton 1320.

Figure 16:
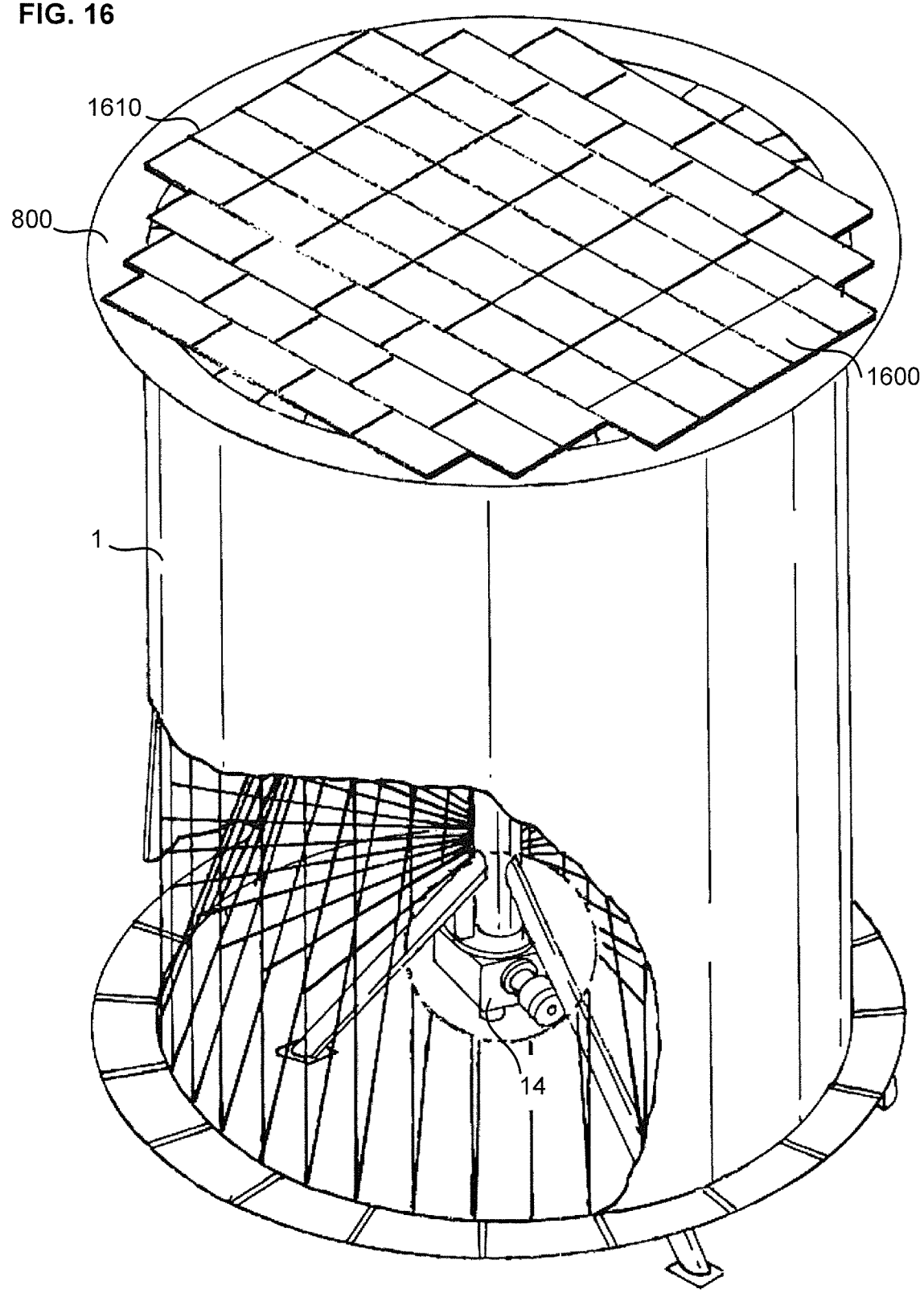
FIG. 16 is an isometric cutaway view of a flettner rotor according to the embodiment shown in FIG. 1 equipped with a solar panel array.

FIG. 16 is a perspective cutaway view of a flettner rotor according to the embodiment shown in FIG. 1 retrofitted with a solar power system. End plate 800 comprises a large surface area and is self cleaning due to the significant wind currents it is routinely exposed to. Therefore, it is an ideal candidate for mounting solar panels 1600 to capture solar energy. As shown in FIG. 16, solar panels 1600 are mounted on end plate 800 creating solar panel array 1610. Solar panels 1600 are interconnected in series in groups which are connected in parallel. Positive and negative terminals for the entire array 1610 are located at the center of end plate 800. Conductors are routed down the center of the stacked core tubes (8, 4, 910) and via a slip ring and brush assembly on to a DC/AC inverter which converts the DC solar energy into AC power that ship 100 can use. The DC/AC inverter is mounted in the vicinity of drive motor 14. A slip ring (also mounted in the vicinity of drive motor 14) prevents the conductors from becoming twisted as a result of the rotation of rotor 1.

The rotor systems described herein offer a novel way of configuring and locating a Flettner propulsion system which is low in cost and contains a minimum of moving parts. It does not interfere with loading and discharging and is dimensioned, so its height does not exceed the height of the mast and standing rig. The system is capable of being easily and momentarily secured in case of extreme wind or excessive roll and pitch of the vessel in the sea, without the use of complex stowing systems.

A single rotor must have a large diameter in order to match the performance of the multiple slim and tall rotors currently being proposed for cargo vessels. Typically a rotor according to the embodiments described herein for a Handysize vessel of 30,000 to 40,000 dwt will be 10 to 20 meters in diameter and 20-25 meters tall. A cylinder this large would be a significant obstacle if placed on the main deck, besides obstructing the view ahead from the bridge. As a consequence, the systems described herein are mounted aft of the deck house and straddle the stern of the vessel with its lower edge raised 3 or 4 meters above deck so as not to impede mooring operations.

An alternative solution suitable for larger vessels may feature a second rotor mounted above the deck and straddling the bow (or located at the extreme forward end of the bow). Locating the second rotor at the extreme bow does not impede loading and discharging and, due to the distance from the helm, may bring the blind sector as viewed from the bridge within the maximum five degree angle specified by the IACS.

A rotor system comprising 1 or 2 large diameter rotors, each generating the same amount of thrust as 3 or 4 slim rotors of similar height has the following advantages. It is less complex and contains fewer moving parts. The cost per ton thrust is reduced by over 50%. The supporting structure may be designed more efficiently within the ample space inside the rotor. Less reinforcement of the deck structure is required since forces may be spread over a larger area. The main support legs can be placed ten or more meters apart and in most cases connected directly to the hull plating near the corners. Having fewer rotors also saves deck space. Furthermore, having a small number of wide rotors can save space when they are mounted elevated above the deck.

Interference with gear and daily operation of the vessel is minimized because the rotor is elevated 3-4 meters above deck, also raising system safety. Rotational speed is reduced from 200-250 rpm to 40-60 rpm thus extending bearing life and periods between scheduled maintenance. Easy installation, possibly during scheduled maintenance, may eliminate down time, and makes retrofitting viable. The systems do not require an additional or specialized crew. They also require little maintenance and have few moving parts. Such systems could save 20-35% on fuel consumption, resulting on a return on investment within one year.

Most scientists and engineers knowledgeable in the art of flettner rotors believe that a rotor must have a high height to diameter ratio in order to perform effectively due to boundary effect being more pronounced in shorter rotors than longer cylinders. This has caused the flettner rotor industry to overlook rotors of low height to diameter ratios. As a result, flettner rotors with a height to diameter ratio of less than six have been avoided in the art.

Those skilled in the art are correct that when comparing rotors with the same projected area but widely different aspect ratios (height to diameter ratio), the rotors with higher aspect ratios will perform significantly better. For example a tall and slim rotor of 20×4 meters will be more effective than a short and stubby one of 10×8 meters when rotating at the same spin ratio. They both have a projected area of 80 square meters but the shorter one will produce less thrust due to higher boundary losses. This is correct, but in the case of equally tall rotors, the pressure gradients near the ends and boundary effects are the similar irrespective of the diameter so in this case the efficiency remains the same for high and low aspect ratios. As a result of this incorrect analysis, those skilled in the art have been led away from producing rotors with low height to diameter ratios, and completely overlooked the benefits of doing so. Thus, those skilled in the art have not used flettner rotors with height to diameter ratios of less than five, much less rotors with ratios of than three, for practical use as wind propulsion systems. More important are the factors that affect practical efficiency, such as: return on investment, reliability, and ease of installation.

The rotor systems described herein solve the aforementioned problems associated with modern rotor ship systems. This is accomplished by providing an easily retrofitable system that does not interfere with normal ship or crew operation. The rotors described herein also generate substantial thrust. When these rotors are coupled with other energy saving technologies such as propeller energy recapturing systems and solar power, their fuel consumption and emissions reduction benefits are further improved. Because these systems are designed for retrofitting, a large portion of the global fleet can take advantage of this technology and a large global reduction in fuel consumption and emissions can be realized. These benefits can be realized in today's market where fewer new ships are being built and the global fleet is aging and outdated, having been designed when low fuel consumption and emissions were not considered as important.

Although the invention has been described with reference to embodiments herein, those embodiments do not limit the scope of the invention. Modifications to those embodiments or different embodiments may fall within the scope of the invention.

What is claimed is:

1. A watercraft, comprising: a deck; and no more than two flettner rotors having a height to diameter ratio of less than five; at least one of said flettner rotors being elevated above said deck such that individuals on said deck can walk underneath said flettner rotor; and a portion of a footprint of at least one of said flettner rotors being suspended over a stern edge of said deck.

2. The watercraft of claim 1, further comprising:
a structure on the watercraft other than a flettner rotor that defines a highest point of the watercraft above a water line;
all of said flettner rotors having a height above the water line not substantially higher than a height of the highest point.

3. The watercraft of claim 2, wherein said structure is a mast.

4. The watercraft of claim 1, wherein a first flettner rotor is mounted at a stern end of said deck and a second flettner rotor is mounted at a bow end of said deck.

5. The watercraft of claim 1, wherein a bottom of said flettner rotor is at least two meters above the surface of said deck.

6. The watercraft of claim 5, wherein the bottom of said flettner rotor is at least three meters above the surface of said deck.

7. The watercraft of claim 1, wherein less than 50% of the footprint of said flettner rotor is located over said deck.

8. The watercraft of claim 7, wherein an axle of the flettner rotor is located off of said deck.

9. The watercraft of claim 8, wherein the axle of said flettner rotor is suspended over the edge of said deck by a cantilever.

10. The watercraft of claim 1, wherein the height to diameter ratio of the flettner rotors is less than three.

11. The watercraft of claim 1, further comprising:
solar panels mounted on the top of at least one of the flettner rotors.

12. The watercraft of claim 11, further comprising:
a solar panel array mounted on the top of at least one of the flettner rotors.

13. A method of manufacturing a flettner rotor comprising the steps of:
(a) assembling a cage;
(b) rotating the cage 360 degrees relative to a supply of sheet;
(c) wrapping a sheet around the cage as they are rotated relative to each other until the cage is substantially covered by the sheet material; and
(d) mounting the sheet to the cage as it is wrapped around the cage.

14. The method of claim 13, wherein step (c) comprises:
(ca) wrapping a segment of the sheet around the circumference of the cage; and
(cb) repeating step (ca) at different heights of the cage until the cage is substantially covered by the sheet material.

15. The method of claim 13, wherein step (c) comprises lifting or lowering the sheet relative to the cage by one width of the sheet per 360 degrees of relative rotation and continuing to wrap the sheet around the cage until the cage is substantially covered by the sheet.

16. A method of retrofitting a flettner rotor onto a ship, comprising the steps of:
(a) providing a previously assembled ship;
(b) manufacturing one or two flettner rotors separately from the ship, the flettner rotors having a height to diameter ratio of less than five;
(c) installing a mounting platform off of a stern or bow end of the deck; and
(d) installing at least one flettner rotor on the mounting platform in an elevated position such that individuals on the deck can walk underneath the flettner rotor and in a position wherein less than 50% of a footprint of the flettner rotor is over the deck.

17. The method of claim 16, wherein a structure on the watercraft other than a flettner rotor defines a highest point of the watercraft above a water line and the flettner rotor has an installed height above the water line not substantially higher than a height of the highest point.

18. The method of claim 17, wherein said structure is a mast.

19. The method of claim 16, wherein a bottom of the flettner rotor is at least two meters above the surface of the deck.

20. The method of claim 19, wherein the bottom of the flettner rotor is at least three meters above the surface of the deck.

21. The method of claim 16, wherein the height to diameter ratio of the flettner rotors is less than three.

22. The method of claim 16, wherein solar panels are mounted on the top of at least one of the flettner rotors.

23. The method of claim 22, wherein a solar panel array is mounted on the top of at least one of the flettner rotors.

* * * * *